(12) United States Patent
Fahldieck

(10) Patent No.: US 8,085,782 B2
(45) Date of Patent: Dec. 27, 2011

(54) DIGITAL COMBINING DEVICE AND METHOD THEREOF

(75) Inventor: Torsten Fahldieck, Ditzingen (DE)

(73) Assignee: Alcatel Lucent, Paris (FR)

(*) Notice: Subject to any disclaimer, the term of this patent is extended or adjusted under 35 U.S.C. 154(b) by 576 days.

(21) Appl. No.: 12/265,511

(22) Filed: Nov. 5, 2008

(65) Prior Publication Data

US 2009/0122745 A1    May 14, 2009

(30) Foreign Application Priority Data

Nov. 8, 2007   (EP) ..................................... 07291341

(51) Int. Cl.
*H04L 12/28*   (2006.01)
*H04J 3/24*    (2006.01)
*H04J 3/07*    (2006.01)

(52) U.S. Cl. ......... 370/394; 370/474; 370/503; 370/535

(58) Field of Classification Search .................. 370/394, 370/474, 503, 535
See application file for complete search history.

(56) References Cited

U.S. PATENT DOCUMENTS

| 7,286,507 B1 | 10/2007 | Oh et al. |
| 2002/0191563 A1* | 12/2002 | Voyer et al. ................... 370/331 |
| 2003/0226071 A1 | 12/2003 | Millar |
| 2003/0227914 A1* | 12/2003 | Nguyen ........................ 370/386 |
| 2009/0003231 A1* | 1/2009 | Hawbaker et al. ............ 370/252 |
| 2009/0059865 A1* | 3/2009 | Zhang et al. .................. 370/331 |
| 2010/0235432 A1* | 9/2010 | Trojer .......................... 709/203 |

FOREIGN PATENT DOCUMENTS

| WO | WO 03/079645 A | 9/2003 |
| WO | WO 2007/004048 A | 1/2007 |

OTHER PUBLICATIONS

European Search Report.

* cited by examiner

*Primary Examiner* — Andrew Lee
(74) *Attorney, Agent, or Firm* — Fay Sharpe LLP

(57) ABSTRACT

The present invention provides a combining device for combining radio signals during uplink transmission in an indoor communication system, the indoor communication system comprising an Ethernet switch, the Ethernet switch connected to a base station and to at least a first and second radio remote headend. The radio remote headend (RRH) is adapted for expanding the wireless coverage of the base station and comprises: means for receiving at least a packet flow from the Ethernet switch, wherein the packet flow comprises packets from at least the first and second RRH, the packet comprises packet data, RRH identification and time stamp of the packets; means for separating the packets according to the RRH origin into at least first and second RRH packet, using the RRH identification; and means for matching the packets with identical time stamp between the first and the second RRH packets. The combining device also comprises means for summing the packet data of the matched packets with a mathematical addition and means for transmitting the summation of the packet data to the Ethernet switch.

19 Claims, 3 Drawing Sheets

DIGITAL COMBINING DEVICE AND METHOD THEREOF

The invention is based on the patent application EP 07 291 341.1 which is hereby incorporated by reference.

TECHNICAL FIELD

The invention relates to a wireless indoor communication system, and more particularly without limitation to a digital combining device for the indoor communication system and to a method in an indoor communication system.

BACKGROUND OF THE INVENTION

In order to provide in-building or indoor coverage for wireless networks services like GSM, UMTS, CDMA or WiMax special deployments are needed. Compared to typical outdoor deployments where a base station with an attached antenna system covers a limited area or cell, an indoor system consists of one or more base stations with one or more detached remote antenna systems or radio remote headends (RRH). The base station is installed inside the building or the indoor location and the remote antenna systems are attached at different locations inside the building. Connected to the base station, the base station interface (BSI) during downlink, converts the digitized radio frequency data from a base station internal format into an Ethernet standard compliant format. The data is then transported trough an Ethernet Network to the remote antenna systems or radio remote headend (RRH). A similar reverse process is repeated by the BSI during uplink transmission.

The Gigabit Ethernet Network is one of the most appropriate transmission networks to communicate the base station interface with the remote antenna systems, due to its cost efficiency and high data rated compared to other technologies. Depending on the number of radio carriers, and the capacity of the radio technology, the data rate on the Ethernet link between the Ethernet switch and the base station interface in uplink direction may exceed the capacity of the Ethernet link.

There is therefore a need for an indoor wireless communication system for improving the transmission of radio data between the remote antennas and the base station, of a digital combining device in the indoor communication system, and a method adapted for performing the steps in accordance with the invention.

SUMMARY OF THE INVENTION

The present invention provides a combining device for combining radio signals during uplink transmission in an indoor communication system, the indoor communication system comprising an Ethernet switch, the Ethernet switch connected to a base station and to at least a first and second radio remote headend. The radio remote headend (RRH) is adapted for expanding the wireless coverage of the base station and comprises: means for receiving at least a packet flow from the Ethernet switch, wherein the packet flow comprises packets from at least the first and second RRH, the packet comprises packet data, RRH identification and time stamp of the packets; means for separating the packets according to the RRH origin into at least first and second RRH packet, using the RRH identification; and means for matching the packets with identical time stamp between the first and the second RRH packets. The combining device also comprises means for summing the packet data of the matched packets with a mathematical addition and means for transmitting the summation of the packet data to the Ethernet switch.

The combining device allows a combination of the uplink data coming from the radio remote headends before it is sent to the Base Station Interface, avoiding a congestion of the Gigabit Ethernet link between the Ethernet switch and the base station interface. The base station interface can be a separate entity connected to the base station or a module within the base station. By synchronizing and summing the uplink data flow before it is sent to the base station interface, the data rate of the summation is reduced compared to the sum of the data rates when they are sent independently. This guarantees that the link capacity between the Ethernet switch and the base station or the base station interface is not exceeded. Another advantage of the combining device is that it does not require adapting the Ethernet switch that includes a summing function and only requires a separate combining device that is attached to a port of the Ethernet switch. The digital combining device may be designed using the digital components of the radio remote headend, so that there is no need to design a complete new apparatus.

In accordance with an embodiment of the invention, the combining device further comprises: means for unpacking the received packets for reading the packet data, packet flow identification and time stamp of the packet; and means for packing the summation of the packet data into Ethernet packets.

In another aspect, the invention relates to an indoor communication system for combining radio signals during uplink transmission comprising at least a first Ethernet switch coupled to a base station, to a first and second radio remote headend being adapted for expanding wireless coverage of the base station, and to a first combining device in accordance with the invention.

In accordance with an embodiment of the invention, in the indoor communication system a second combining device is coupled to a second port of the Ethernet switch, the second combining device further comprises: means for receiving a second packet flow comprising packets of at least a third and a fourth RRH, wherein the third and fourth RRH are connected to the Ethernet switch. One of the advantages of the embodiments, is that by having a separate apparatus or device to complete the summation of the data flow, it allows a flexible implementation and connection to the indoor communication system. By connecting two or more combining devices to the Ethernet switch, receiving two or more data flows coming from different radio remote headends and splitting the summation functions between the two or more combining devices, an easy adaptation to changes within the indoor communication system is achieved. A further connection of more radio remote headends to the building or the indoor location does not require further changes in the network infrastructure.

In accordance with an embodiment of the invention, in the indoor communication system a second Ethernet switch is connected to the first Ethernet switch forming a cascade connection, wherein the second Ethernet switch is connected to at least a third and a fourth RRH and to a second combining device, wherein the second combining device is in accordance with the invention and further comprises: means for receiving a second packet flow comprising packets of at least a third and fourth RRH and the summation of the packet data of the first combining device.

The cascade connection of the Ethernet switch and the combining devices allows adapting the system to the topology and infrastructure of the location or building, and using a first combining device for the summation of a first group of radio remote headends. It further allows sending the result of the combination to a second Ethernet switch that has as well further remote headends connected to it, so that a second combining device will proceed to the summation of the three data flows. Alternatively, the first combining device connected to the first Ethernet switch may send the result of the summing function directly to the base station and the base station interface and the second combining device will send a second uplink data flow to the base station interface and the base station.

In another aspect, the invention relates to a method for combining radio signals in an indoor communication system during uplink transmission, the indoor communication system comprising at least a first Ethernet switch connected to a base station, to at least a first combining device and to at least first and second radio remote headends, the radio remote headends being adapted for expanding wireless coverage of the base station. The method comprises the steps of: receiving a packet flow from the first Ethernet switch by the first combining device, wherein the packet flow comprises packets from at least the first and second RRH, the packet comprises packet data, RRH identification and time stamps of the packets; separating the packets according to the RRH origin into at least a first RRH and a second RRH packet by the combining device using the RRH identification. The method further comprises matching the packets with the identical or substantially identical time stamp between the first and second RRH packet by the first combining device; summing the packet data of the matched packets with the mathematical addition by the first combining device; and transmitting the summation of the packet data to the first Ethernet switch by the first combining device.

In accordance with an embodiment of the invention, the method further comprises: unpacking the received packets for reading the packet data, RRH identification and time stamp of the packet by the combining device; and packing the summation of the packet data into Ethernet packets by the combining device.

In accordance with an embodiment of the invention, the method further comprises a second combining device in accordance with the invention is coupled to a second port of the Ethernet switch, wherein the second combining device is adapted for receiving second packet flow comprising packets of at least a third and a fourth RRH, wherein the third and fourth RRH are connected to the Ethernet switch.

In a further embodiment, a second Ethernet switch is connected to the first Ethernet switch, wherein second Ethernet switch is further connected to at least a third and a fourth RRH and to a second combining device, wherein the second combining device is in accordance with the invention and is adapted for: receiving a second packet flow comprising packets of at least the third and fourth RRH and summation of the packet data of the first combining device.

In another aspect, a computer program product comprising computer executable instructions to perform any of the method steps in accordance with the invention. One of the advantages of the embodiments, is that allows using the existing infrastructure as the Gigabit Ethernet switch and avoids a congestion of the communication between the different apparatus of the indoor communication system. The implementation of the combining device only requires the digital component of the radio remote headends and a computer program product within the new device to perform the method steps in accordance with the invention.

BRIEF DESCRIPTION OF THE DRAWINGS

In the following preferred embodiments of the invention are described in greater detail by way of example only making reference to the drawings in which.

DETAILED DESCRIPTION OF PREFERRED EMBODIMENTS

Figure 1:
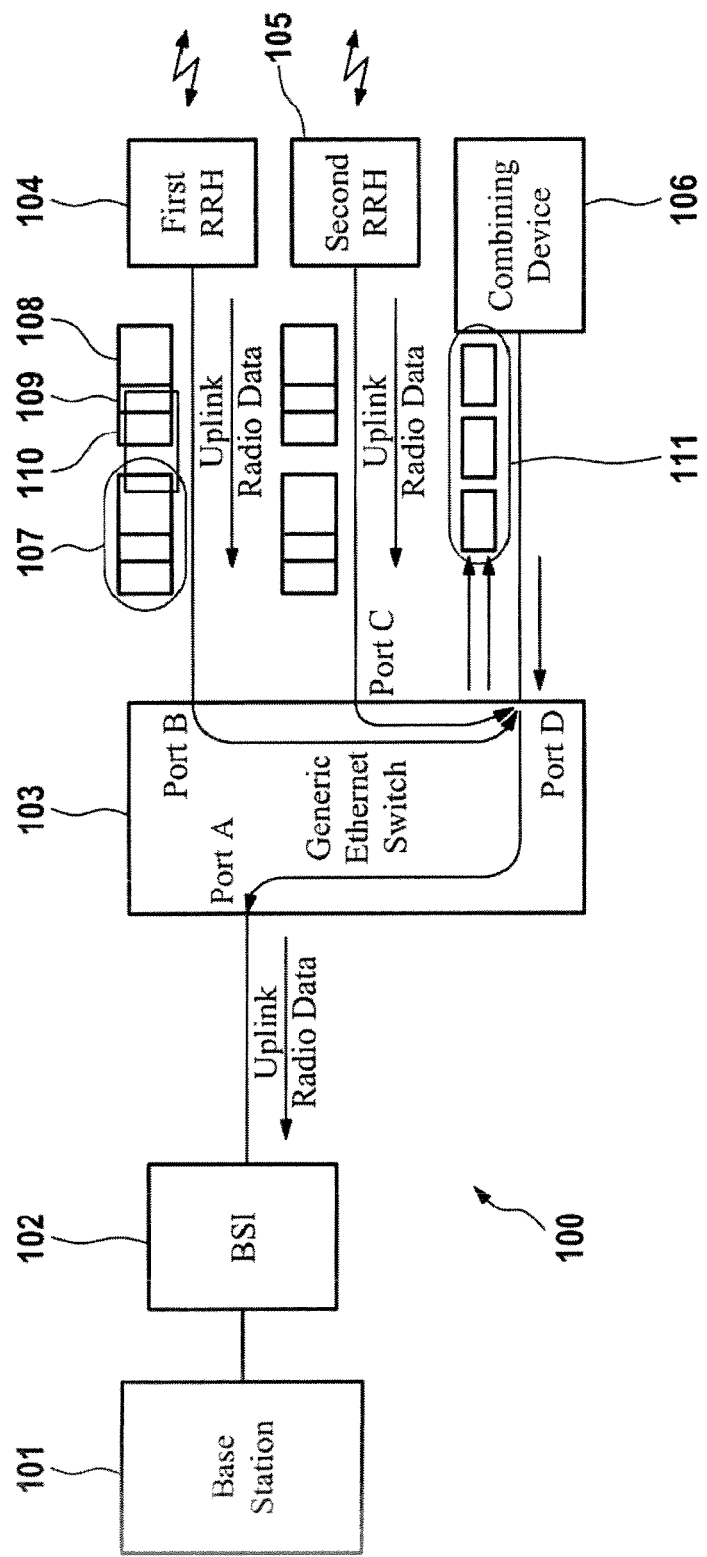
FIG. 1 is a block diagram of an indoor communication system in accordance with a first preferred embodiment of the invention.

FIG. 1 shows a block diagram of an indoor communication system 100 that includes a base station 101 connected to a base station interface 102, the base station interface 102 is connected to an Ethernet switch 103 that is coupled to a first and second remote radio headend 104, 105 and to a combining device 106. The radio remote headends are distributed at different locations inside a building or infrastructure. The base station interface can be a separate entity connected to the base station or a module within the base station. During an uplink transmission, the radio remote headends receive the radio data from one or a plurality of mobile terminals located inside the building. The radio remote headends digitize the data and packs it into an Ethernet packet that includes a time stamp of the packet, an identification of the radio remote headend 107 and the packet data 108. The Ethernet packet 107 is sent to the Ethernet switch along with the plurality of packets being originated from the radio remote headend. When the Ethernet switch 103 receives the plurality of packets coming from at least the first and second radio remote headend, it forwards the packets to the port where the combining device 106 is located.

Then, the combining device receives the packet flow 111 from the Ethernet switch 103, wherein the packet flow 111 includes packets coming from the first and second radio remote headend 104, 105. The combining device unpacks the received packets in order to read the packet data 108, the RRH identification 109 and the time stamp 110 from the plurality of packets. With this information, the combining device 106 is able to separate the packets according to the radio remote headend (RRH) origin into the at least first and second RRH or according to the amount of radio remote headends that are connected to the Ethernet switch.

Further, the combining device 106 uses the RRH identification 109 to separate the packets according to the origin, and subsequently, it compares the time stamp 110 between the first and second RRH packets, in order to find the match between the packets with identical time stamp. The combining device 106 groups or synchronizes these matched packets with identical time stamp 110, and sums the packet data 108 using a mathematical addition. The result of the summation of the data 108 is packed into an Ethernet packet and sent back to the Ethernet switch 103, that will forward the data to the port where the base station interface 102 and the base station 101 is located.

The combining device has the advantage that the traffic in the uplink direction between the Ethernet switch and the base station interface or the base station 101 is reduced by summing the packet flow coming from the plurality of radio remote headends, before they are transmitted to the base station interface. This summation is accomplished using a combining device that is easily connected through port of the Ethernet switch 103, reducing the total amount of data rate to be transmitted by the Ethernet switch. The combining device has a further advantage that, depending on the number of radio carriers of the communication system and the number of radio remote headends connected to the Ethernet switch, the capacity of the radio technology may exceed the capacity of the Ethernet link and the possible amount of radio data to be transmitted to the base station. The combining device does not require further modification within the Ethernet switch or the radio remote headends, as the required summing function is accomplished by an external device connected to the indoor communication system.

Figure 2:
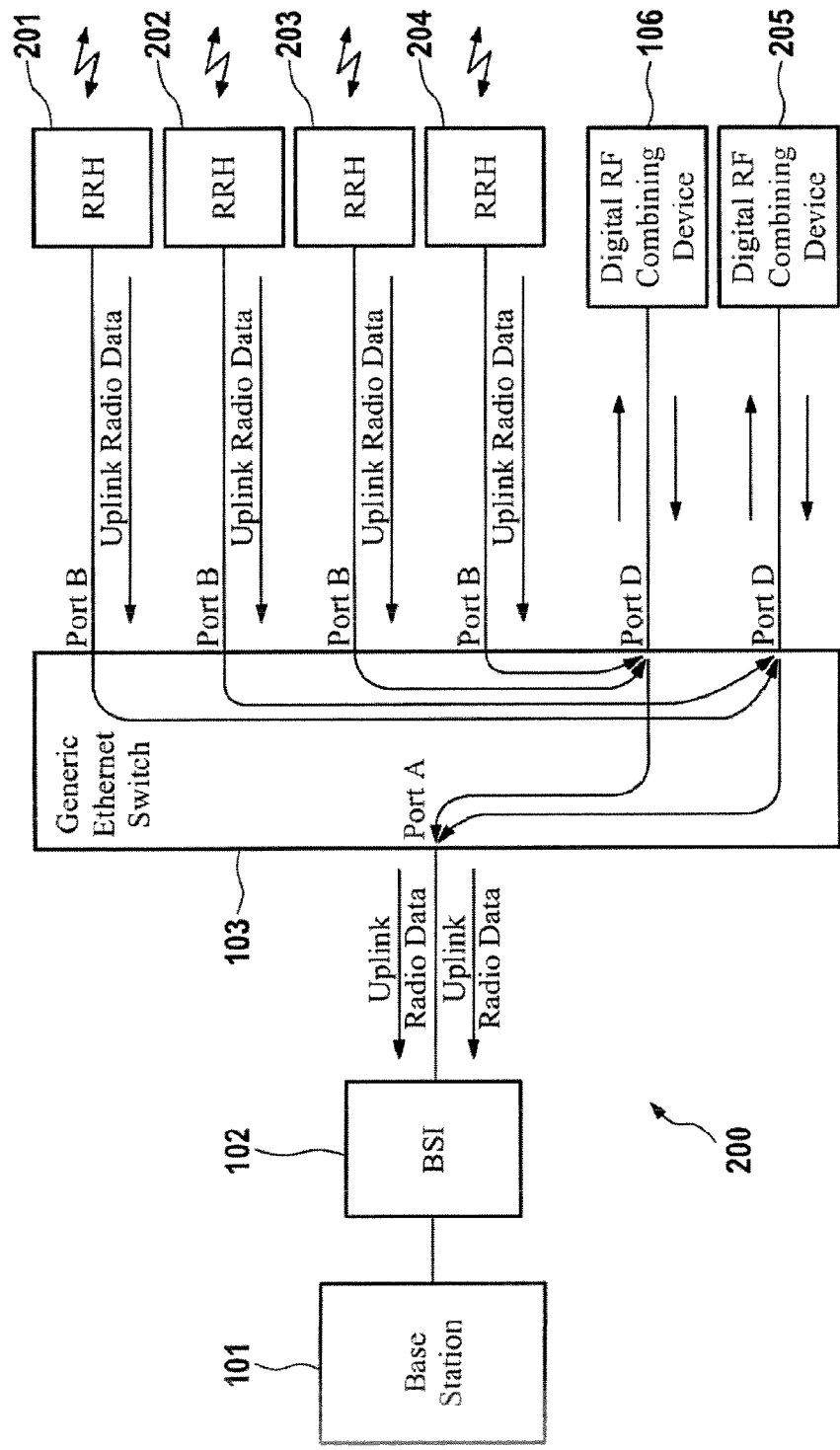
FIG. 2 is a block diagram illustrating a second preferred embodiment of the invention.

FIG. 2 shows a block diagram of an indoor communication system 200 that includes a base station 101 connected to a base station interface 102, the base station interface 102 coupled as well to the Ethernet switch 103. The Ethernet switch 103 is connected to four radio remote headends 201-204 and to a first combining device 106 and 205. FIG. 2 presents a possible further embodiment of the indoor communication system, where the packet flow of four radio remote headends connected to the Ethernet switch 103 is distributed along to at least two combining devices 106, 205, so that after reception and digital conversion of the radio data by the plurality of radio remote headends, the packet flow is sent to the Ethernet switch and two of the packet flows go to the first combining devices and the remaining two packet flows from the radio remote headends 203 and 204 are forwarded to the second combining device 205.

The combining devices 106, 206 follow the same steps in parallel that include: receiving the packet flow from the Ethernet switch, separating the packets according to the radio remote headend origin, matching the packets with identical time stamp between the different RRH packets and the summation of the packet data with the identical time stamp through a mathematical addition. Both summation of the packet data coming from the combining devices is then forwarded to the port where the base station 101 and the base station interface 102 is connected, so that the base station presses further both uplink radio data.

Another advantage of the combining device and of the improved indoor communication system is that it can be adapted to the different infrastructures and number of radio remote headends and it may simply require connecting one or a plurality of combining devices, so that the uplink radio data between the Ethernet switch and the base station interface is reduced.

Figure 3:
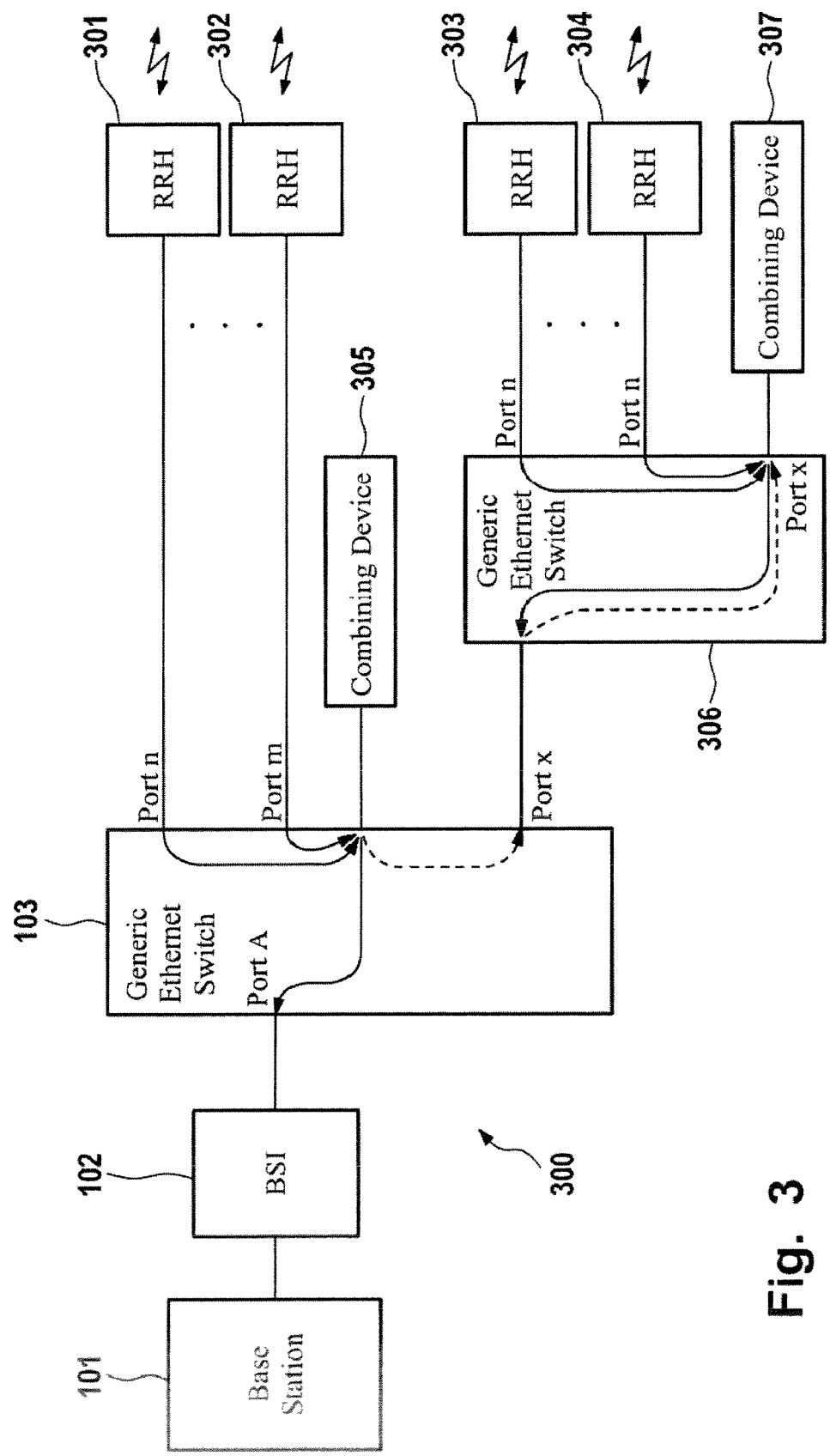
FIG. 3 is a block diagram of a further preferred embodiment of an indoor communication system of the invention.

FIG. 3 shows a block diagram of an indoor communication system 300 that includes a base station 101, base station interface 102 and an Ethernet switch 103 connected to the base station interface 102, to four radio remote headends 301-304 and to a first combining device 305. The Ethernet switch 103 is further connected to a second Ethernet switch 306, and the second Ethernet switch 306 is connected to two radio remote headends 303, 304 and to a second combining device 307. During uplink transmission, the plurality of radio remote headends received wireless data coming from the mobile terminals located inside the building and digitizes or converts this data and sends it to the Ethernet switch. The radio remote headends 301 and 302 sends two flows of packets to the first Ethernet switch 103 and a radio remote headends 303, 304 sends further flows of packets to the second Ethernet switch 306. The Ethernet switch 103 and 306 forward these flows of packets coming from the radio remote headends to the combining devices that are attached to one of the ports of the Ethernet switches.

Then, the combining devices 305, 307 receive the packet flow and separate the packets according to the radio remote headend origin into at least two RRH types of packets using the RRH identification. Further, it compares the time stamp between the groups of the RRH packets and matches the packets with identical time stamp. The packet data of the matched packets is summed with a mathematical addition and the result of this summation is packed into an Ethernet packet and sent back to the Ethernet switch connected to the combining device. The second Ethernet switch 306 forwards the packet flow from the combining devices to the port where the first Ethernet switch is located, and the first Ethernet switch 103 forwards this packet flow coming from the Ethernet switch and the packet flow coming from the combining devices to the port where the base station interface 102 is located for further processing by the base station 101.

Alternatively, in this cascade connection of the Ethernet switch, the first combining device 305 may accomplish the summation of the packet flows coming from the first and second radio remote headends 301, 302 and when the result of the summation is sent back to the Ethernet switch 103, the result will be sent to the second Ethernet switch 306, that will forward this received packet flow from the Ethernet switch to the combining device 307. The combining device 307 also receives the packet flows coming from the third and fourth radio remote headends 303, 304 connected to the second Ethernet switch 306 and sums the packet data of the packets with an identical time stamp as described above. The second combining device 305 will sum the packets from both radio remote headends and the result of the summation from the first combining device 305. The result of this summation is then forwarded by the Ethernet switch 306 back to the first Ethernet switch 103, that sends the result with a single uplink packet flow to the base station interface 102. This method and this topology of the indoor communication system are advantageous if the amount of radio remote headends is so big that the amount of carriers is above the capacity of the Ethernet switch.

LIST OF REFERENCE NUMERALS

| | |
|---|---|
| 101 | Base Station |
| 102 | Base Station Interface |
| 103 | Ethernet Switch |
| 104 | First RRH |
| 105 | Second RRH |
| 105 | Packet |
| 106 | Combining Device |
| 107 | Packet |
| 108 | Packet data |
| 109 | RRH Identification |
| 110 | Time stamp |
| 111 | Packet Flow |
| 201 | RRH |
| 202 | RRH |
| 203 | RRH |
| 204 | RRH |
| 205 | Second Combining device |
| 301 | RRH |
| 302 | RRH |
| 303 | RRH |
| 304 | RRH |
| 305 | First Combining Device |
| 306 | Second Ethernet Switch |
| 307 | Second Combining Device |

The invention claimed is:

1. A combining device for combining radio signals during uplink transmission in an indoor communication system, the indoor communication system comprising an Ethernet switch, the Ethernet switch connected to a base station and to at least a first and a second radio remote headend, the RRHs being adapted for expanding wireless coverage of the base station, the combining device comprising:

means for receiving at least a packet flow from the Ethernet switch, wherein the packet flow comprises packets from at least the first and second RRH, the packets comprises packet data, RRH Identification and time stamp of the packets;

means for separating the packets according to the RRH origin into at least first and second RRH packets, using the RRH Identification;

means for matching the packets with identical time stamp between the first and second RRH packets;

means for summing the packet data of the matched packets with a mathematical addition;

means for transmitting the summation of the packet data to the Ethernet switch.

2. The combining device as claimed in claim 1 further comprises:

means for unpacking the received packets for reading the packet data, RRH identification and time stamp of the packet;

means for packing the summation of the packet data into Ethernet packets.

3. A method for combining radio signals in an indoors communication system during uplink transmission, the indoor communication system comprising at least a first Ethernet switch connected to a Base Station, to at least a first combining device and to at least first and second radio remote headend being adapted for expanding wireless coverage of the base station, the method comprising the steps of:

receiving a packet flow from the first Ethernet switch by the first combining device, wherein the packet flow comprises packets from at least the first and second RRH, the packets comprising packet data, RRH Identification and time stamp of the packets;

separating the packets according to the RRH origin into at least first RRH and second RRH packets by the combining device, using the RRH Identification;

matching the packets with identical time stamp between the first and second RRH packets by the first combining device;

summing the packet data of the matched packets with a mathematical addition by the first combining device; and transmitting the summation of the packet data to the first Ethernet switch by the first combining device.

4. The method as claimed in claim 3 further comprising:

unpacking the received packets for reading the packet data, RRH Identification and time stamp of the packet by the first combining device; and packing the summation of the packet data into Ethernet packets by the combining device.

5. The method as in claim 3, wherein a second combining device is coupled to a second port of the Ethernet switch, wherein the second combining device is adapted for receiving a second packet flow comprising packets of a at least a third and a fourth RRH, wherein the third and fourth RRH are connected to the Ethernet switch.

6. The method as in claim 3, wherein a second Ethernet switch is connected to the first Ethernet switch, wherein the second Ethernet switch is further connected to at least a third and a fourth RRH and to a second combining device, wherein the second combining device is adapted for: receiving a second packet flow comprising packets of at least the third and fourth RRH and the summation of the packet data of the first combining device.

7. The method as in claim 4, wherein a second combining device is coupled to a second port of the Ethernet switch, wherein the second combining device is adapted for receiving a second packet flow comprising packets of a at least a third and a fourth RRH, wherein the third and fourth RRH are connected to the Ethernet switch.

8. The method as in claim 4, wherein a second Ethernet switch is connected to the first Ethernet switch, wherein the second Ethernet switch is further connected to at least a third and a fourth RRH and to a second combining device, wherein the second combining device is adapted for: receiving a second packet flow comprising packets of at least the third and fourth RRH and the summation of the packet data of the first combining device.

9. The method as in claim 7, wherein a second Ethernet switch is connected to the first Ethernet switch, wherein the second Ethernet switch is further connected to at least a third and a fourth RRH and to a second combining device, wherein the second combining device is adapted for: receiving a second packet flow comprising packets of at least the third and fourth RRH and the summation of the packet data of the first combining device.

10. A non-transitory computer readable medium comprising computer executable instructions for combining radio signals in an indoors communication system during uplink transmission, the indoor communication system comprising at least a first Ethernet switch connected to a Base Station, to at least a first combining device and to at least first and second radio remote headend (RRH) being adapted for expanding wireless coverage of the base station, the non-transitory computer readable medium comprising computer executable instructions for:

receiving a packet flow from the first Ethernet switch by the first combining device, wherein the packet flow comprises packets from at least the first and second RRH, the packets comprising packet data, RRH Identification and time stamp of the packets;

separating the packets according to the RRH origin into at least first RRH and second RRH packets by the combining device, using the RRH Identification;

matching the packets with identical time stamp between the first and second RRH packets by the first combining device;

summing the packet data of the matched packets with a mathematical addition by the first combining device; and transmitting the summation of the packet data to the first Ethernet switch by the first combining device.

11. The computer readable medium of claim 10, comprising computer executable instructions for:

unpacking the received packets for reading the packet data, RRH Identification and time stamp of the packet by the first combining device; and packing the summation of the packet data into Ethernet packets by the combining device.

12. The computer readable medium of claim 11, wherein a second combining device is coupled to a second port of the Ethernet switch, wherein the second combining device is adapted for receiving a second packet flow comprising packets of a at least a third and a fourth RRH, wherein the third and fourth RRH are connected to the Ethernet switch.

13. The computer readable medium of claim 12, wherein a second Ethernet switch is connected to the first Ethernet switch, wherein the second Ethernet switch is further connected to at least a third and a fourth RRH and to a second combining device, wherein the second combining device is adapted for: receiving a second packet flow comprising packets of at least the third and fourth RRH and the summation of the packet data of the first combining device.

14. The computer readable medium of claim 11, wherein a second Ethernet switch is connected to the first Ethernet switch, wherein the second Ethernet switch is further connected to at least a third and a fourth RRH and to a second combining device, wherein the second combining device is adapted for: receiving a second packet flow comprising packets of at least the third and fourth RRH and the summation of the packet data of the first combining device.

15. The computer readable medium of claim 10, wherein a second combining device is coupled to a second port of the Ethernet switch, wherein the second combining device is adapted for receiving a second packet flow comprising packets of a at least a third and a fourth RRH, wherein the third and fourth RRH are connected to the Ethernet switch.

16. The computer readable medium of claim 10, wherein a second Ethernet switch is connected to the first Ethernet switch, wherein the second Ethernet switch is further connected to at least a third and a fourth RRH and to a second combining device, wherein the second combining device is adapted for: receiving a second packet flow comprising packets of at least the third and fourth RRH and the summation of the packet data of the first combining device.

17. An indoor communication system for combining radio signals during uplink transmission, comprising:
   at least a first Ethernet switch coupled to a base station, and to a first and a second radio remote headend (RRHs) for expanding wireless coverage of the base station; and
   a first combining device for combining radio signals during uplink transmission in the indoor communication system, the first combining device being coupled to the first Ethernet switch, and comprising:
   means for receiving at least a packet flow from the first Ethernet switch, wherein the packet flow comprises packets from at least the first and second RRHs, the packets comprises packet data, RRH Identification and time stamp of the packets,
   means for separating the packets according to the RRH origin into at least first and second RRH packets, using the RRH Identification,
   means for matching the packets with identical time stamp between the first and second RRH packets,
   means for summing the packet data of the matched packets with a mathematical addition, and
   means for transmitting the summation of the packet data to the Ethernet switch.

18. The indoor communications system as in claim 17, wherein a second combining device is coupled to a second port of the first Ethernet switch, the second combining device further comprising: means for receiving a second packet flow comprising packets of at least a third and a fourth RRH, wherein the third and fourth RRHs are connected to the first Ethernet switch.

19. The indoor communications system as in claim 17, wherein a second Ethernet switch is connected to the first Ethernet switch forming a cascade connection, wherein the second Ethernet switch is connected to at least a third and a fourth RRH and to a second combining device, wherein the second combining device further comprises: means for receiving a second packet flow comprising packets of at least the third and fourth RRHs and the summation of the packet data of the first combining device.

* * * * *